(12) United States Patent
Tanimoto

(10) Patent No.: US 7,160,607 B2
(45) Date of Patent: Jan. 9, 2007

(54) LAMINATE DAMPING BASE MATERIAL, AND DAMPING STRUCTURE WITH STACK OF THIS BASE MATERIAL

(75) Inventor: Toshio Tanimoto, Fujisawa (JP)

(73) Assignee: Kurimoto, Ltd., Osaka (JP)

( * ) Notice: Subject to any disclaimer, the term of this patent is extended or adjusted under 35 U.S.C. 154(b) by 280 days.

(21) Appl. No.: 10/491,247

(22) PCT Filed: Aug. 9, 2002

(86) PCT No.: PCT/JP02/08201

§ 371 (c)(1),
(2), (4) Date: Mar. 30, 2004

(87) PCT Pub. No.: WO03/033256

PCT Pub. Date: Apr. 24, 2003

(65) Prior Publication Data

US 2005/0062365 A1 Mar. 24, 2005

(30) Foreign Application Priority Data

Oct. 12, 2001 (JP) .............................. 2001-315295

(51) Int. Cl.
*B32B 27/04* (2006.01)
*B32B 27/14* (2006.01)
*B32B 27/20* (2006.01)

(52) U.S. Cl. ................ 428/297.4; 428/299.1; 428/299.4; 428/300.4; 428/300.7; 428/301.1

(58) Field of Classification Search ............ 428/297.4, 428/298.1, 299.1, 299.4, 300.4, 300.7, 301.1
See application file for complete search history.

(56) References Cited

U.S. PATENT DOCUMENTS 5,955,822 A 9/1999 Schutze et al.
6,703,766 B1 * 3/2004 Duerr .................. 310/340

FOREIGN PATENT DOCUMENTS

| DE | 19712292 | | 1/1998 |
| GB | 2323654 | | 9/1998 |
| JP | 06085346 A | * | 3/1994 |
| JP | 07284198 A | * | 10/1995 |
| JP | 9-216958 | | 8/1997 |
| JP | 10-132021 | | 5/1998 |

* cited by examiner

OTHER PUBLICATIONS

Toshio Tanimoto, "Vibration Suppression in Fiber-Reinforced Plastics," Mar. 25, 1998, pp. 1-12, Shonan Institute of Technology, Tsuijdo-Nishikaigan, Fujisawa, Kanagawa 251-8511, Japan.

*Primary Examiner*—Ramsey Zacharia
(74) *Attorney, Agent, or Firm*—Vedder Price Kaufman & Kammholz

(57) ABSTRACT

A damping structure which dispenses of the connection of a resistor used for a conventional damping structure and undergoes diverse molding processings with a simpler structure, and a laminate damping base material constituting such a damping structure. A laminate damping base material made of a piezoelectric ceramic material or piezoelectric polymer material and a conductive fiber-reinforced plastic (FRP) composition is prepared. One to a plurality of this base material are stacked to constitute a first damping structure. A second damping structure is constituted by stacking at least a layer of piezoelectric polymer film or piezoelectric ceramic thin film between a multilayer laminate that is a laminate of conductive laminate FRP base materials.

11 Claims, 3 Drawing Sheets

LAMINATE DAMPING BASE MATERIAL, AND DAMPING STRUCTURE WITH STACK OF THIS BASE MATERIAL

TECHNICAL FIELD

The present invention relates to a laminate damping base material, and a damping structure with stack of the base material.

BACKGROUND ARTS

Fiber-reinforced plastic (FRP) has been used in general industrial structures and as structural materials for a wide range of fields such as aerospace and energy, due to its lightweight, high strength and high rigidity features.

While various characteristics are required for structural frameworks, it has recently become very important to develop a technology for suppressing or lowering vibrations among the above-described characteristics in terms of improvement of positional accuracy of structures and improvement in reliability of incorporated equipment.

However, the oscillation-damping characteristics of FRP is generally low, which is considerably inferior to that of metallic structures. Therefore, the present inventor developed a damping structure A (Fabric Engineering, Vol. 51, No. 3 (1998)) in which piezoelectric ceramics 5 and 6 are adhered to both sides of the outside of an FRP laminated structure 4 and a resistor 7 is connected between the respective piezoelectric ceramics 5 and 6 as shown in FIG. 3, in order to improve the oscillation-damping characteristics of FRP.

The presumed principle of damping using the piezoelectric ceramics is based on that, when an external force is applied to the piezoelectric ceramics, electric charge is generated by a piezoelectric effect, and electric energy is dissipated as Joule heat by causing the electric charge to pass through a resistor connected between the piezoelectric ceramics.

However, since it is necessary to connect a resistor to the outside of the above-described damping structure, there are disadvantages in terms of structure when such a damping structure is applied to practical applications provided with various molding processes.

The present invention was developed in view of the above-described problems and shortcomings, and it is therefore an object to provide a damping structure with simpler structure, which does not require connection of any resistor used for prior art damping structures and can be provided with various molding processes, and a damping base material for lamination which is a member of the above damping structure.

SUMMARY OF THE PRESENT INVENTION

A damping structure for lamination according to the present invention comprises a piezoelectric ceramics material or a piezoelectric polymer material and a fiber-reinforced plastic (FRP) compound having conductivity.

Also, grains consisting of at least one type of ceramics materials selected from lithium niobate ($LiNbO_3$), barium titanate ($BaTiO_3$), lead titanate ($PbTiO_3$), lead zirconate titanate (PZT), and lead metaniobate ($PbNb_2O_6$) are preferably used as the above-described piezoelectric ceramics material.

In addition, fine grains obtained by cutting a film made of a fluorine-based polymer material are preferably used as the above-described piezoelectric polymer materials. In detail, one type of resin material selected from monopolymers of polyvinylidene fluoride, co-polymers of vinylidene fluoride and trifluoroethylene, and co-polymers of vinylidene fluoride and tetrafluoroethylene may be preferably used as the above-described piezoelectric polymer material.

Further, a reinforcing material made of carbon fibers and a matrix made of plastic may be preferably used as the above-described FRP composition having conductivity.

At least one type of reinforcing material selected from glass fibers, aramid fibers, silicon carbide (SiC) fibers, and boron fibers; at least one type of conductive material selected from metallic powder, graphite and carbon black; and a matrix made of plastic may be preferably used as the above-described FRP composition having conductivity.

A first damping structure according to the present invention is constructed by laminating one or a plurality of the above-described damping base material. Also, the damping structure is constructed by sequentially laminating the damping base materials so that the fabric direction of fabrics composing one damping base material does not overlap with the fabric direction of fabrics composing another damping base material directly laminated on the one damping base material, thereby obtaining a lamination structure in which anisotropy of rigidity that damping base materials originally hold is mitigated, wherein the mechanical properties of the damping structure can be made excellent.

In addition, the first damping structure according to the present invention is favorable since the oscillation-damping characteristics can be synergistically improved by adhering piezoelectric ceramics to both sides of the outside of the damping structure and connecting the piezoelectric ceramics via an electric resistor in addition to the above-described construction.

In addition, the first damping structure according to the present invention is favorable since the oscillation-damping characteristics can be synergistically improved by laminating at least one layer of viscoelastic polymer film between the damping structures in addition to the above-described construction. In detail, a polyorefin-based film may be preferably used as the viscoelastic polymer film.

Also, a second damping structure according to the present invention is featured in that at least one layer of piezoelectric polymer film or piezoelectric ceramics thin film is laminated between multi-layered laminated structures in which a plurality of FRP base materials having conductivity are laminated.

A fluorine-based polymer is preferable as the above-described piezoelectric polymers. In detail, at least one type of polymer selected from monopolymers of polyvinylidene fluoride, co-polymers of vinylidene fluoride and trifluoroethylene, and co-polymers of vinylidene fluoride and tetrafluoroethylene may be preferably used.

Also, at least one type of ceramics materials selected from lithium niobate ($LiNbO_3$), barium titanate ($BaTiO_3$), lead titanate ($PbTiO_3$), lead zirconate titanate (PZT), and lead metaniobate ($PbNb_2O_6$) may be preferably used as the above-described piezoelectric ceramics material.

Also, a reinforcing material made of carbon fibers and a matrix made of plastic may be preferably used as the above-described FRP base material having conductivity.

At least one type of reinforcing material selected from glass fibers, aramid fibers, silicon carbide (SiC) fibers, and boron fibers; at least one type of conductive material selected from metallic powder, graphite and carbon black; and a matrix made of plastic may be preferably used as the above-described FRP base material having conductivity.

In addition, the second damping structure according to the present invention is favorable since the oscillation-damping characteristics can be synergistically improved by adhering piezoelectric ceramics to both sides of the outside of the damping structure and connecting the piezoelectric ceramics via an electric resistor in addition to the above-described construction.

In addition, the second damping structure according to the present invention is favorable since the oscillation-damping characteristics can be synergistically improved by laminating at least one layer of viscoelastic polymer film between the damping structures in addition to the above-described construction. In detail, a polyorefin-based film may be preferably used as the viscoelastic polymer film.

DESCRIPTION OF THE PREFERRED EMBODIMENT

Figure 1:
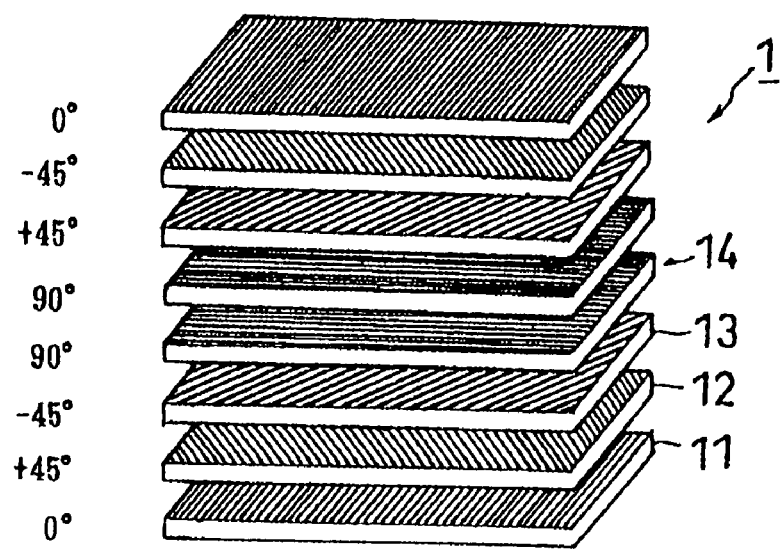
FIG. 1 shows an embodiment of the first damping structure of the present invention.

Hereinafter, a description is given of a laminate damping base material and a damping structure with stack of the base material accordingly thereto according to the present invention.

First, there are two types of damping structure according to the present invention, the first type (hereinafter called a "first damping structure") in which a piezoelectric ceramics material or a piezoelectric polymer (hereinafter called a "piezoelectric material") exists in a granular, powdery granular or fine granular form, and the second type (hereinafter called a "second damping structure") in which a piezoelectric material exists in a film-like or thin membrane-like form. Also, the first damping structure is constructed by laminating a laminate damping base material according to the present invention as one unit. The following description is given with items classified as follows: a laminate damping base material being a construction member of the first damping structure, the first damping structure, and the second damping structure.

[Laminate Damping Base Material]

A laminate damping base material (hereinafter called a "damping base material") according to the present invention comprises a piezoelectric material and a fiber-reinforced plastic (FRP) composition having conductivity. In the present invention, it is preferable that the damping base material is molded so as to have a fixed shape and a fixed thickness. And the damping base material is used as a member of the first damping structure according to the present invention constructed by laminating a plurality of damping base materials. Also, the damping base material according to the present invention may comprise a single layer construction in which a piezoelectric material is dispersed with the above-described FRP, or may comprise a two-layer construction consisting of an FRP composition and a piezoelectric material layer by spraying and adhering the piezoelectric material onto the outer surface of the FRP composition. Hereinafter, a description is given of a composition material of the damping base material.

The piezoelectric material used for the damping base material has a role of converting vibration energy to electric energy when an external force is applied to the damping base material. A material having piezoelectricity, that is, a material that is instantaneously distorted when an external force is applied and generates electric charge is preferable as the piezoelectric material. In particular, a piezoelectric ceramics material or a piezoelectric polymer material may be preferably used.

Lithium niobate ($LiNbO_3$), barium titanate ($BaTiO_3$), lead titanate ($PbTiO_3$), lead zirconate titanate (PZT), and lead metaniobate ($PbNb_2O_6$) may be listed as preferable piezoelectric ceramics materials. These compositions may be preferably used independently or in a combination of a plurality thereof.

Since it is necessary to spray and adhere the above-described piezoelectric ceramics material onto the outer surface of an FRP composition having conductivity or to disperse the same in the above-described FRP composition, the above-described piezoelectric ceramics material is preferably used in the form of grains. Also, there is no special limitation in grain size, grain shape and blending quantity of the piezoelectric ceramics material where the piezoelectric ceramics materials are used as grains. That is, the grain size, grain shape and blending quantity may be adequately designed so that the productivity and piezoelectricity of the damping base material can be optimized.

Meanwhile, a fluorine-based polymer material may be listed as a preferable piezoelectric polymer material. In detail, monopolymers of polyvinylidene fluoride, co-polymers of vinylidene fluoride and trifluoroethylene, and co-polymers of vinylidene fluoride and tetrafluoroethylene may be listed. These may be preferably used independently or in a combination of a plurality thereof.

In addition, generally, since a polymer material used for the present invention takes on piezoelectricity by employing a method (this method is called "poling") for returning to a room temperature after causing polarization (residual polarization) by applying a high electric field to the extended material resin at a high temperature including and less than a melting point, the polymer material is necessarily used in the form of a film. Therefore, it is preferable that the film is cut in the form of fine grains in order to bring about desired piezoelectricity by spraying and adhering the film to the outer surface of FRP composition having conductivity or dispersing the film in the above-described FRP composition.

The FRP composition used in the damping base material has rigidity as a damping base material, allows electric charge to pass through, which is generated when an external force is applied to the above-described piezoelectric material, and at the same time has a role of converting electric energy to Joule heat as a resistor of electric charge. In the present invention, it is preferable in terms of cost that the constructing material of the FRP composition is made different, in the cases where a fabric material having conductivity (hereinafter called a "conductive fabric material") is used and a fabric material not having any conductivity (hereinafter called a "non-conductive fabric material") is used.

Hereinafter, a description is given of the FRP composition in the cases of the conductive fabric material and non-conductive fabric material.

Where the conductive fabric material is used, by using a reinforcement material composed of a conductive fabric material and a matrix made of plastic as indispensable components, it is possible to compose an FRP composition having desired conductivity in the present invention. Here, carbon fibers are preferably used as the conductive fabric material.

Further, as the plastic provided as the matrix, it is possible to use a publicly known thermo-setting resin or thermoplastic resin, which are used as fiber-reinforcing plastic. For example, unsaturated polyester resin, epoxy resin, phenol resin, melamine resin, silicone resin, etc., may be preferably used as the thermo-setting resin. On the other hand, polyamide resin, acetar resin, polycarbonate resin, vinyl chloride resin, ABS resin, engineering plastic resin, polyethylene resin, polypropyrene resin, polyestyrene resin, methacryl resin, fluorine resin, saturated polyester resin, AS resin, etc., may be preferably used as the thermoplastic resin.

Where the non-conductive fabric material is used, by using a reinforcing material made of anon-conductive fabric material, a matrix made of plastic, and a conductive material as indispensable components, it is possible to compose a FRP composition having desired conductivity in the present invention. Herein, glass fibers, aramid fibers, silicon carbide (SiC) fibers, and boron fibers are preferably used as the non-conductive fabric material. Also, these may be preferably used independently or in a combination of a plurality thereof.

Also, as plastic, it is possible to use a publicly known thermo-setting resin or thermoplastic resin, which are used as fiber-reinforcing plastic. For example, unsaturated polyester resin, epoxy resin, phenol resin, melamine resin, silicone resin, etc., may be preferably used as the thermo-setting resin. On the other hand, polyamide resin, acetar resin, polycarbonate resin, vinyl chloride resin, ABS resin, engineering plastic resin, polyethylene resin, polypropyrene resin, polyestyrene resin, methacryl resin, fluorine resin, saturated polyester resin, AS resin, etc., may be preferably used as the thermoplastic resin.

In addition, metallic powder, graphite and carbon black may be preferably used as the conductive material. Further, these may be preferably used independently or in a combination of a plurality thereof. The blending ratio of a conductive material to the damping base material may be adequately designed to an optimal quantity in response to the conductive properties when being made into the damping base material, wherein there is no special limitation.

As described above, the damping base material according to the present invention may be made into a single-layer construction in which a piezoelectric material is dispersed with respect to the above-described FRP composition or may be made into a double-layered construction consisting of an FRP composition layer and a piezoelectric material layer by spraying and adhering the piezoelectric material onto the outer surface of the FRP composition. Therefore, in the present invention, there is no special limitation in that the construction is made into one layer or a double layer.

However, since the dispersion of a piezoelectric material with respect to the FRP composition generally differs according to whether the fiber material contained in the FRP composition is short or long, it is preferable to adequately design the layer construction of the damping base material in response to the shape of the fabric material when producing the damping base material.

In detail, a single layer construction is preferable where short fibers are used, and a double-layer construction is preferable where long fibers are used.

Next, a description is given of a method for producing the damping base material. First, where either of a conductive fiber or non-conductive fiber is used, these fibers may be preferably used in the processed form of woven fabric (hereinafter called a "fabric base material"). There is no special limitation in the form of woven fabric. However, generally, plain woven cloth, satin cloth, roving cloth, and filament wound cloth may be preferably used independently or in a combination thereof. Also, where it is desired that a high-strength damping base material be constructed, the above-described fabric being intensively pulled in one direction may preferably used.

For example, the damping base material of a mono-layered structure is produced by dispersing a piezoelectric material in a melted resin of plastic and then immersing the above-described fabric base material composed of carbon fibers therein and hardening the melted resin. Also, the damping base material of a double-layered structure is produced by immersing the above-described fabric base material made of carbon fibers in a plastic melted resin and then spraying and adhering a piezoelectric material to the outer surface of the melted resin of plastic.

In addition, where a thermo-setting resin is used as a resin, it is possible to produce a semi-hardened damping base material (so called "prepreg"). Since such a damping base material has some viscosity, it is preferable in terms of production because, where the first damping structure according to the present invention is produced by overlapping a plurality of damping base materials, it is possible to easily laminate respective damping base materials by heating and compressing operations.

The above-described damping base material of a mono-layered structure is constructed with the piezoelectric material disposed in an FRP composition having conductivity. Therefore, where an external force is applied to the damping base material, the following energy conversion is brought about. First, when an external force (a mechanical vibration energy) is applied to a damping base material, the vibration energy is converted to electric energy by a piezoelectric effect of the piezoelectric material existing in the entirety of the damping base material, and electric charge is generated in a wide range of the damping base material. And, the electric charge thus generated flows in the entire damping base material by a conductive action of the conductive substance, and a majority of electric energy is converted to Joule heat in the entire damping base material by actions of a resistor of the conductive substance. And, the converted Joule heat is dissipated outside of the damping base material, consequently energy applied to the inside of the damping base material is reduced.

Also, the above-described damping base material of a double-layered structure is constructed by the piezoelectric material and FRP composition having conductivity respectively forming separate layers. Therefore, when an external force is applied to a damping base material, the following energy conversion is brought about. First, when an external force (a mechanical vibration energy) is applied to the damping base material, the vibration energy is converted to electric energy in a narrow area of the damping base material by a piezoelectric effect of a piezoelectric material concentrated in and existing in the piezoelectric material layer, thereby generating electric charge. And, the electric charge thus generated flows in the entirety of the damping base material by a conductive action of the conductive substance contained in the entire FRP composition, and at the same time, a majority of electric energy is converted to Joule heat in a wide range of the damping base material by actions of a resistor of the conductive substance. And, the converted Joule heat is dissipated outside the damping base material, consequently the energy applied to the inside of the damping base material is reduced.

[First Damping Structure]

The first damping structure according to the present invention is produced by laminating one or a plurality of the above-described damping base materials and processed to be molded as a multi-layered laminate structure by carrying out compression and heating. The compressing and heating conditions of the damping base material are not specially limited. The compressing and heating conditions may be adequately established to optimal conditions in response to a damping base material used.

Further, in the present invention, where a damping structure is constructed by laminating a plurality of damping base materials upward one upon another, it is preferable that such a laminate structure is employed, by which anisotropy of rigidities which the respective damping base materials inherently hold can be mitigated. Hereinafter, a description is given below of this point, taking an instance of a damping structure in which damping base materials of a monolayered structure are laminated.

As shown in FIG. 1, the damping structure 1 is constructed in such a manner that, where the fabric direction of fabrics composing the first damping base material 11 is regarded as reference (0°) and the fabric direction of fabrics composing the second damping base material 12 is +45°, the second damping base material 12 is laminated above the first damping base material 11, hereinafter, the third damping base material 13 is laminated above the second damping base material in the fabric direction of −45°, and further the fourth damping base material 14 is laminated above the third damping base material in the fabric direction of 90°, wherein one or a plurality of sets, each of which is composed of four base materials laminated in the directions of [0°/+45°/−45°/90°], are laminated one upon another (In the present specification, the laminate structure is called a "Quasi-equal rectangular laminate construction").

Also, a damping structure in which one or a plurality of laminate structures having two damping base materials laminated at [0°/90°] is laminated may be listed as another example (in the present specification, the laminate construction is called a "Cross-shaped laminate construction").

That is, it is preferable that a laminate construction in which the fabric directions of the respective damping base materials are completely different from each other is composed as a set, and one or a plurality of sets of the laminate construction are laminated to produce a damping structure. By employing such a laminate construction, the anisotropy in rigidities that the damping base materials inherently hold can be abated in various directions, wherein it is possible to reduce the anisotropy in rigidity when being fabricated as a damping structure, and the damping structure is able to have further favorable mechanical properties.

Next, a description is given of the presumed damping principle of the first damping structure. The first damping structure is constructed by laminating one or a plurality of damping base materials having the above-described energy converting action. Therefore, when an external force is applied to the first damping structure 1, vibration energy is transmitted to the entirety of individual damping base materials which are components, and the vibration energy is converted to electric energy (generation of electric charge) by a piezoelectric effect of a piezoelectric material dispersed in and existing in the individual damping base materials. Subsequently, the generated electric charge is mostly converted to Joule heat by resistance when it flows in the individual damping base materials, and the Joule heat is dissipated. That is, since the vibration energy remaining after the above-described process is considerably reduced from the initial vibration energy, it is possible to quickly attenuate the vibrations of the damping structure.

The first damping structure according to the present invention is featured in that it does not require any external resistor used in prior art damping structures and is constructed by laminating one or a plurality of layers of a damping base material constructed by dispersing a conductive material acting as an internal resistor and a piezoelectric material for converting mechanical energy to electric energy. The first damping structure succeeds in providing damping characteristics with a very simple construction as a structure.

Also, the construction of the first damping structure is as described above. However, by adequately combining technical elements used in the prior art damping structure with the first damping structure, it is possible to synergistically improve the damping characteristics. For example, such a construction may be employed, in which piezoelectric ceramics are adhered to both sides of the outside of the first damping structure, respectively, and these piezoelectric ceramics are connected to each other via electric resistors. Or, such a construction may also be employed, in which at least one layer of viscoelastic polymer film (for example, polyorefin-based film) is laminated between the first damping structures. The damping principle of the latter damping structure in which a viscoelastic polymer film is inserted is based on vibration energy being converted to thermal energy by slip deformation of the film and being dissipated.

As has been described above, the first damping structure according to the present invention has excellent damping control characteristics as a multi-layered laminate structure of FRP. Therefore, since such a structure has excellent vibration attenuation performance and noise-proofing and noise-silencing performance in addition to being lightweight and having high strength, it can be used in various fields as a structure. For example, it can be used as an excellent damping material in a wide range of fields such as robot arms, windmill materials for wind power generation, automobiles, vehicles, vessels, sports materials (golf shafts, tennis rackets), etc.

In addition, the first damping structure can be used as excellent soundproofing and sound insulation materials in civil engineering and building fields and in various types of machines and electric components.

[Second Damping Structure]

The second damping structure according to the present invention is constructed by laminating at least one layer of piezoelectric film or piezoelectric thin film (hereinafter called a "piezoelectric film (thin film)") between FRP multilayered structures constructed by laminating a plurality of laminate FRP base materials having conductivity. Hereinafter, a description is given of respective composing materials.

First, the piezoelectric film (thin film) has a role of converting vibration energy to electric energy when an external force is applied to the second damping structure. A material showing piezoelectricity, that is, a film or a thin film composed of a material that is instantaneously distorted when an external force is applied and generates electric charge is preferable as the piezoelectric film (thin film). In particular, a thin film of piezoelectric ceramics or a film of a piezoelectric polymer may be preferably used.

Those used in the above-described laminate damping base material may be used as a piezoelectric ceramics material composing the thin film of piezoelectric ceramics and a piezoelectric polymer material composing a film of piezoelectric polymer. In addition, the thickness of the thin film or film may be adequately designed so as to obtain an optimal piezoelectric property, wherein there is no special limitation.

A laminate FRP base material having conductivity has rigidity as a damping base material, and the same laminate FRP base material has a role of allowing electric charge, which is generated when an external force is applied to the above-described piezoelectric film (thin film), to pass through and convert electric energy to Joule heat as a resistor of electric charge. Also, the material composing the laminate FRP base material may be similar to the FRP composition used for the above-described laminate damping base material. FRP base materials available on the market may be used as they are. In detail, if a laminate base material (prepreg) composed of carbon fibers and thermo-setting resin and available on the market is used, it is not necessary to newly produce an FRP base material. Further, since it is possible to easily carry out laminate molding of the base materials, the second damping structure according to the present invention can be easily produced.

Figure 2:
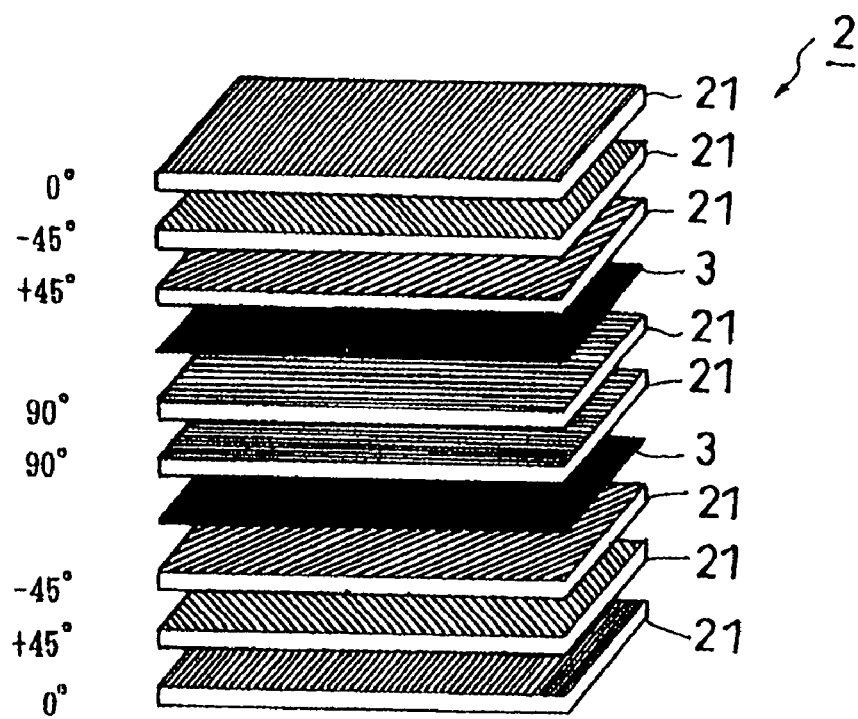
FIG. 2 shows an embodiment of the second damping structure of the present invention.
Figure 3:
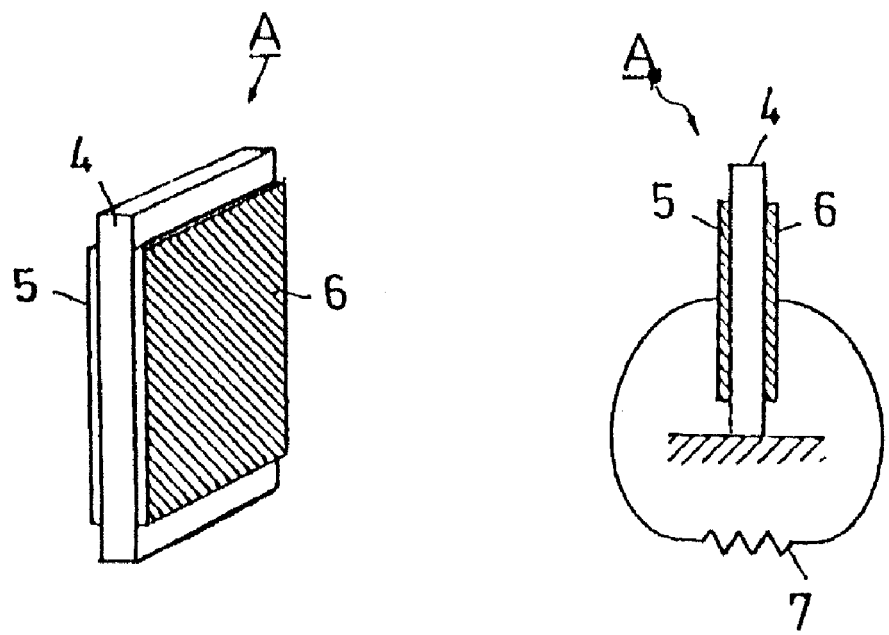
FIG. 3 shows an example of a prior art damping structure.

The second damping structure is constructed by laminating at least one layer of piezoelectric film (thin film) between a multilayered structure constructed by laminating a plurality of laminate FRP base materials having conductivity. First, on the basis of the same reason as described in the first damping structure, it is preferable that the FRP base materials are laminated so that the anisotropy of rigidities which the individual FRP base materials inherently hold is mitigated. For example, as shown in FIG. 2, a plurality of FRP base materials 21 are laminated with quasi-equal rectangularity, and next, the above-described piezoelectric film (thin film) 3 is inserted and adhered between the FRP base materials 21 and 21, wherein it is possible to produce the second damping structure 2. There is no special limitation in the shape, dimension, position and quantity of the piezoelectric films (thin films) to be inserted, and these factors may be adequately designed so as to obtain the optimal piezoelectric characteristics. In addition, with respect to a method for adhering the piezoelectric film (thin film) and FRP base materials, a publicly known adhesive agent may be used unless sufficient adhering strength is obtained with a normal heat pressure-fitting operation.

Next, a description is given of the presumed damping principle of the second damping structure. When an external force is applied to the second damping structure, vibration energy is first generated, and the vibration energy is instantaneously converted to electric energy (electric charge is generated) by a piezoelectric effect of the piezoelectric film (thin film) as soon as the vibration energy reaches the piezoelectric film (thin film). Next, a majority of the vibration energy is converted to Joule heat by resistance applied to the generated electric charge flowing in the FRP, and the Joule heat is dissipated. That is, since the vibration energy remaining after the above-described process is considerably reduced from the initial vibration energy, it is possible to quickly attenuate the vibrations of the damping structure.

The second damping structure according to the present invention is featured in that it does not require any external resistor used in prior art damping structures and it contains uniformly a dispersed conductive material as an internal resistor and it further comprises inside the damping structure a piezoelectric body in the form of a film (thin film) which converts mechanical energy to electric energy. Therefore, the second damping structure succeeds in achieving damping characteristics with a very simple structure as a structure.

The construction of the second damping structure is as described above. However, by adequately combining technical elements used in the prior art damping structure with the second damping structure, it is possible to synergistically improve the damping characteristics. For example, such a construction may be employed, in which piezoelectric ceramics are adhered to both sides of the outside of the second damping structure, respectively, and these piezoelectric ceramics are connected to each other via electric resistors. Or, such a construction may also be employed, in which at least one layer of viscoelastic polymer film is laminated between the second damping structures. The damping principle of the latter damping structure in which a viscoelastic polymer film is inserted is based on vibration energy being converted to thermal energy by slip deformation of the film and being dissipated.

As has been described above, the second damping structure according to the present invention has excellent damping control characteristics as a multi-layered laminate structure of FRP. Therefore, since such structure has excellent vibration attenuation performance and noise-proofing and noise-silencing performance in addition to being lightweight and having high strength, it can be used in various fields as a structure. For example, it can be used as an excellent damping material in wide range of fields such as robot arms, windmill materials for wind power generation, automobiles, vehicles, vessels, sports materials (golf shafts, tennis rackets), etc.

In addition, the second damping structure can be used as a structure in civil engineering and building fields and in various types of machines and electric components as excellent soundproofing and sound insulation materials.

Hereinafter, a further detailed description is given of the present invention on the basis of embodiments. However, the present invention is not limited to the embodiments.

[Composing Materials]

One-direction carbon/epoxy prepreg (Brand name: Torayca T800H/#2500, Toray Industries, Inc.) was used as laminate FRP. Polyvinylidene fluoride (PVDF) (Brand name: Kureha KF polymer: Kureha Chemicals Industries, Ltd.) was used as a piezoelectric polymer.

Lead zirconate titanate (PZT) was used as piezoelectric ceramics. Lead zirconate titanate (PZT) (Brand name: C-82, Fuji Ceramics Co., Ltd.) was used as a raw material of a piezoelectric ceramics sheet. The piezoelectric ceramics sheet whose dimensions are 10 mm×15 mm×0.28 mm was used.

[Embodiment 1]

By spraying PZT grains, whose mean grain size is 6.5 μm, onto a single side of the outside of a laminate FRP having dimensions of 90 mm long and 15 mm wide at a spraying quantity of 9.26 grams per square meter, a laminate damping base material having PZT grains adhered and fixed on the surface of a laminate FRP was prepared. In this connection, since the above-described laminate FRP is a semi-hardened type prepreg and has adequate viscosity, the PZT grains could be easily adhered and fixed on the surface of the laminate FRP. Next, the laminate damping base material was laminated in a cross-like laminate construction of [0°/90°/90°/0°] and was subjected to autoclave processing for three hours under a temperature of 130° C. at 5 bars, thereby having prepared the first damping structure in which four laminate damping base materials are laminated.

[Comparative Example 1]

A damping structure was prepared, which is the same as the Embodiment 1 excepting that PZT grains are not dispersed and fixed on a single surface of the outside of the laminate FRP.

[Evaluation of Dynamic Characteristics]

Figure 4:
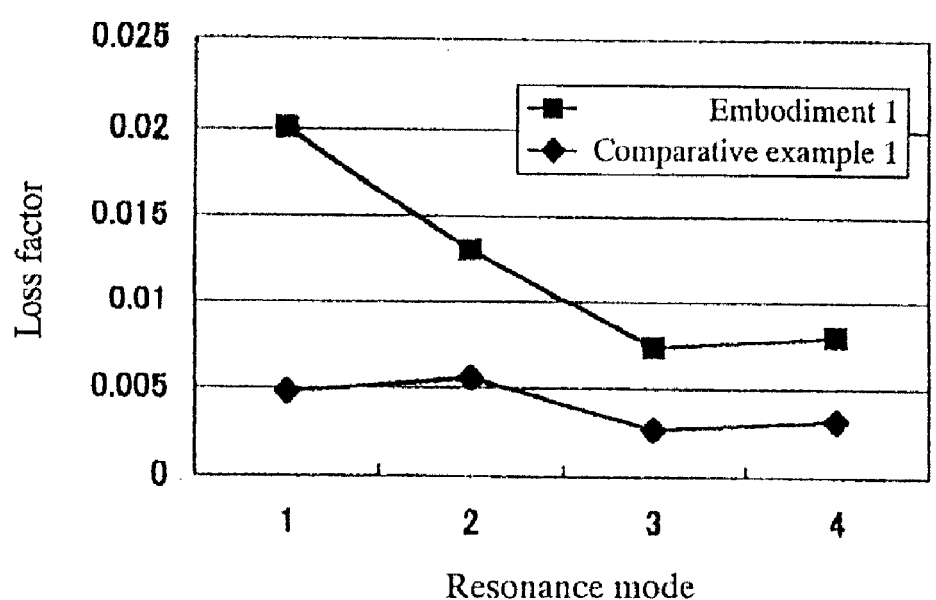
FIG. 4 shows a relationship between a resonance mode of the first damping structure and loss factor thereof.

With respect to the above-described two types of structures, a cantilever beam type vibration test in which one end of the structure is fixed while the other free end thereof is vibrated was carried out, and loss factor were calculated with respect to the first through fourth resonance modes. The results are as shown in FIG. 4.

[Embodiment 2]

A laminate FRP whose dimensions are 70 mm long and 15 mm wide is laminated in a cross-shaped laminate construction of [0°/90°/90°/0°], and a piezoelectric polymer film (15 mm wide ×10 mm long) was inserted between 90° and 90°. The same laminate FRP was subjected to autoclave processing for three hours under a temperature of 110° C. at 5 bars, thereby having prepared the second damping structure. The piezoelectric polymer film was inserted in the single side end of the laminate structure.

[Embodiment 3]

A piezoelectric ceramics sheet was adhered to both sides of the outside at the single side end of the damping structure as prepared in Embodiment 2, and these piezoelectric ceramics sheets were connected to each other via an electric resistor. Also, the polarization direction of the respective piezoelectric ceramics sheets was oriented toward the outside direction.

[Comparative Example 2]

A damping structure which is the same as the Embodiment 2 excepting that the piezoelectric polymer film is not inserted was prepared.

[Comparative Example 3]

The piezoelectric ceramics sheet used in Embodiment 3 is adhered to both sides of the outside of the single side end of the damping structure prepared in Comparative example 2, and the piezoelectric ceramics sheets are connected to each other via an electric resistor.

[Evaluation of Dynamic Characteristics]

A cantilever beam type vibration test was carried out with respect to the above-described four types of structures. Loss factor were calculated with respect to the first through fourth resonance modes. The results are as shown in FIG. 5.

[Result]

As shown in FIG. 4, Embodiment 1 showed a greater loss factor than that of the Comparative example 1 in all of the first through fourth resonance modes. It was thereby confirmed that the first damping structure according to the present invention shows higher damping characteristics than the FRP structure (Comparative example 1) in which prepreg including conventional carbon fibers is laminated.

Figure 5:
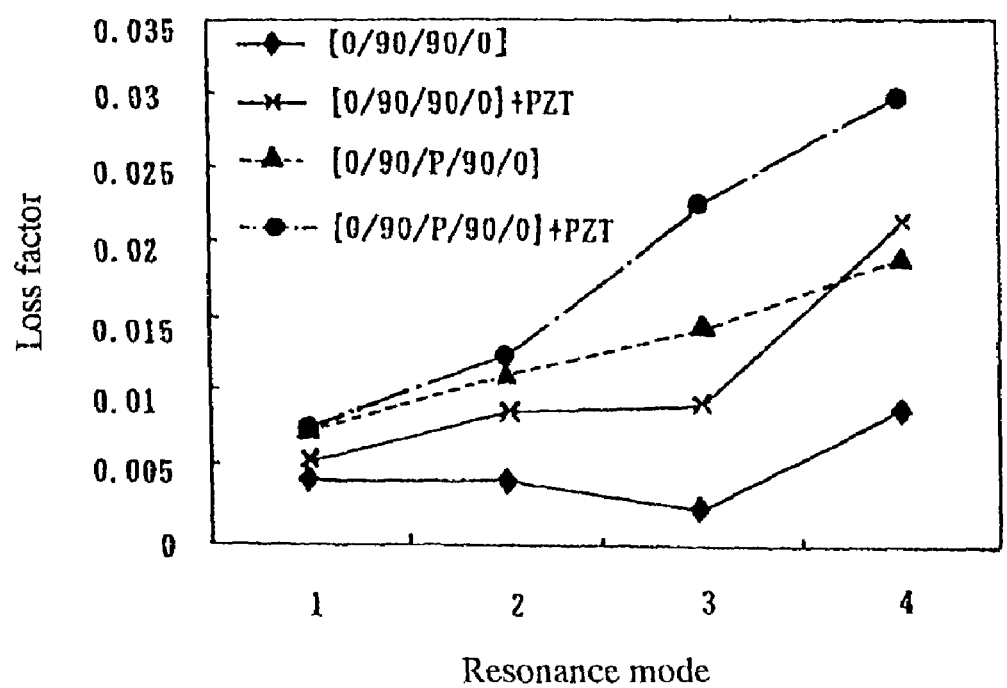
FIG. 5 shows a relationship between a resonance mode of the second damping structure and loss factor thereof.

Also, as shown in FIG. 5, Embodiments 2 and 3 showed greater loss factor than those of Comparative examples 2 and 3 in all of the first through fourth resonance modes. On the basis of the above-described results, it was confirmed that both means (Embodiment 2) for inserting a piezoelectric polymer film in the FRP multilayered structure and means (Embodiment 3) for adhering piezoelectric ceramics sheets to both sides of the outside of a single side end of a damping structure via an electric resistor in addition to the above-described means according to the Embodiment 2 show high damping characteristics.

Further, in all the resonance modes, Embodiment 3 showed a greater loss factor than Embodiment 2. Thus it is confirmed that, by adhering a piezoelectric ceramics sheet to both sides of the outside of the single side end of a damping structure and causing an electric resistor to intervene therebetween, a synergistic effect of the damping characteristics is brought about.

INDUSTRIAL APPLICABILITY

As has been described above, since the first damping structure according to the present invention is constructed by laminating one or a plurality of damping base materials according to the present invention, in which a piezoelectric material is dispersed on an FRP composition having conductivity, the first damping structure has excellent damping performance and noise-proofing and noise-silencing performance in addition to being lightweight and having high strength.

In addition, the second damping structure according to the present invention is constructed so that a piezoelectric material is inserted and laminated in the form of a sheet or a thin film between FRP laminate structures having conductivity, and consequently the second damping structure has excellent damping performance and noise-proofing and noise-silencing performance in addition to being lightweight and having high strength.

What is claimed is:

1. A laminate damping base material comprising a grain piezoelectric ceramics material or a grain piezoelectric polymer material sprayed and adhered onto an outer surface of a fiber-reinforced plastic (FRP) composition having conductivity.

2. The laminate damping base material as set forth in claim 1, wherein the piezoelectric ceramics material is a grain composed of at least one type of ceramics materials selected from lithium niobate ($LiNbO_3$), barium titanate ($BaTiO_3$), lead titanate ($PbTiO_3$), lead zirconate titanate (PZT), and lead metaniobate ($PbNb_2O_6$).

3. The laminate damping base material as set forth in claim 1, wherein the piezoelectric polymer material is a grain obtained by cutting a film made of a fluorine-based polymer material.

4. The laminate damping base material as set forth in claim 3, wherein the fluorine-based polymer material is at least one type of resin materials selected from monopolymers of polyvinylidene fluoride, co-polymers of vinylidene fluoride and trifluoroethylene, and co-polymer of vinylidene fluoride and tetrafluoroethylene.

5. The laminate damping base material as set forth in any one of claim 1 through claim 4, wherein the FRP composition having conductivity includes a reinforcing material made of carbon fibers and a matrix made of plastic.

6. The laminate damping base material as set forth in any one of claim 1 through claim 4, wherein the FRP composition having conductivity includes at least one type of reinforcing materials selected from glass fibers, aramid fibers, silicon carbide (SiC) fibers, and boron fibers; at least one type of conductive materials selected from metallic powder, graphite and carbon black; and a matrix made of plastic.

7. A damping structure having a laminate damping base material described in claim 1 laminated in a plurality of layers.

8. The damping structure as set forth in claim 7, wherein said laminate damping base materials are laminated sequentially so that the direction of fibers composing one laminate damping base material and the direction of fibers composing another laminate damping base material directly laminated on said one laminate damping base material do not overlap each other, and anisotropy in rigidities that the laminate damping base materials hold is mitigated.

9. The damping structure having piezoelectric ceramics adhered to both sides of the outside of the damping structure described in claim 8, wherein said piezoelectric ceramics are connected via an electric resistor.

10. The damping structure having at least one layer of viscoelastic polymer film laminated between the damping structures described in claim 9.

11. The damping structure as set forth in claim 10, wherein the viscoelastic polymer film is a polyolefin-based film.

* * * * *

UNITED STATES PATENT AND TRADEMARK OFFICE
CERTIFICATE OF CORRECTION

PATENT NO.          : 7,160,607 B2
APPLICATION NO. : 10/491247
DATED                  : January 9, 2007
INVENTOR(S)         : Toshio Tanimoto It is certified that error appears in the above-identified patent and that said Letters Patent is hereby corrected as shown below:

On Title Page

Item 73 should read
Assignee(s):   Kurimoto, Ltd., Osaka (JP)

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,160,607 B2
APPLICATION NO. : 10/491247
DATED : January 9, 2007
INVENTOR(S) : Toshio Tanimoto It is certified that error appears in the above-identified patent and that said Letters Patent is hereby corrected as shown below:

On Title page
Item 73 should read
Assignee(s):   Toshio Tanimoto, Fujisawa (JP)
               Toshio Klmura, Amagasaki (JP)
               Kurimoto, Ltd., Osaka (JP)

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,160,607 B2  
APPLICATION NO. : 10/491247  
DATED : January 9, 2007  
INVENTOR(S) : Toshio Tanimoto Page 1 of 1

It is certified that error appears in the above-identified patent and that said Letters Patent is hereby corrected as shown below:

Item 73 On Title Page should read  
Assignee(s):   Toshio Tanimoto, Fujisawa (JP)  
               Toshio Kimura, Amagasaki (JP)  
               Kurimoto, Ltd., Osaka (JP)

Signed and Sealed this

Twenty-sixth Day of February, 2008

JON W. DUDAS  
*Director of the United States Patent and Trademark Office*